United States Patent [19]

Cohen-Skalli et al.

[11] Patent Number: 5,235,674

[45] Date of Patent: Aug. 10, 1993

[54] METHOD AND DEVICE FOR ADAPTING A PRINTER INTO AN AUTONOMOUS FACSIMILE APPARATUS

[75] Inventors: Claude Cohen-Skalli, Saint-Cloud; Antoine Simonnet, Paris, both of France

[73] Assignee: Decimal Snc P. Skalli et Compagnie, Paris, France

[21] Appl. No.: 581,950

[22] Filed: Sep. 13, 1990

[30] Foreign Application Priority Data

Sep. 13, 1989 [FR] France ............................. 89 11975

[51] Int. Cl.⁵ .................. G06K 15/00; G06F 3/12; H04N 1/40
[52] U.S. Cl. .................... 395/101; 358/442; 358/468
[58] Field of Search ............... 364/DIG. 1, DIG. 2; 395/101, 275; 358/402, 442, 468, 296, 401; 379/100

[56] References Cited

U.S. PATENT DOCUMENTS

| | | | |
|---|---|---|---|
| 3,830,962 | 8/1974 | Mailloux | 358/442 X |
| 4,404,658 | 9/1983 | Kikuchi et al. | 346/76 PH |
| 4,702,630 | 10/1987 | Igi et al. | 400/82 |
| 4,910,607 | 3/1990 | Kita et al. | |
| 4,947,345 | 8/1990 | Paradise et al. | 364/519 |
| 4,991,200 | 2/1991 | Lin | 379/100 |
| 5,021,892 | 6/1991 | Kita et al. | |

FOREIGN PATENT DOCUMENTS 62-248359 10/1987 Japan .

OTHER PUBLICATIONS

Patent Abstracts of Japan, vol. 12, No. 124, E-601, Apr. 16, 1988.

*Primary Examiner*—Robert L. Richardson
*Attorney, Agent, or Firm*—Young & Thompson

[57] ABSTRACT

The device serves to adapt a printer to an autonomous facsimile transmission apparatus. It comprises line interface for transmitting and receiving data conveyed via a telephone line; a printing interface; an input interface for entering data derived from at least one external digital device; a coder/decoder connected to the line interface for respectively encoding and decoding data derived respectively from the input interface and from the line interface. Data derived from the input interface either towards the line interface is routed via the coder/encoder or towards the printing interface. Data derived from the line interface is routed towards the printing interface.

18 Claims, 1 Drawing Sheet

METHOD AND DEVICE FOR ADAPTING A PRINTER INTO AN AUTONOMOUS FACSIMILE APPARATUS

FIELD OF THE INVENTION

The present invention relates to a method of adaptation of a printer to an autonomous facsimile transmission function.

The invention is also directed to a device for its implementation and to the application of this device to printers and reprography systems.

BACKGROUND OF THE INVENTION

Facsimile transmission and reception of documents can be performed at the present time in accordance with two different procedures.

The first procedure consists in using a standard commercial facsimile unit which remains on permanent standby for calls and automatically prints any received copy. It is also capable of transmitting documents from a built-in reading system. This type of apparatus, however, is attended by the following disadvantages:

This is a dedicated machine which therefore does not permit reprocessing of computerized data transmitted or received in any data-processing system.

The quality of printing of received copy is limited to that of a thermal print commonly employed in all dedicated facsimile units.

By reason of its manual operation, it is impossible to create automatic systems for sharing this machine between a number of users without obliging them to wait until the machine is free before in turn being able to transmit their document.

The second procedure consists in using a microcomputer in which is inserted a facsimile card associated with a facsimile management package and connected to a printer via a series or parallel interface.

This procedure is also subject to appreciable drawbacks. In the first place, it makes use of an internal connector of the microcomputer at the expense of other extension cards and implies in addition that the microcomputer should be allowed to operate continuously in order to permit facsimile reception at each instant. However, continuous operation of the microcomputer may present problems of reliability, especially in the presence of hard disks containing important data.

In the second place, this procedure neutralizes part of the microcomputer resources. In fact, the associated package is very often multi-task so as not to convert the microcomputer to a dedicated machine, which would considerably limit the advantage of this solution. This package necessarily consumes a substantial part of the computing power of the microcomputer processor both in order to manage the multitask aspect but also, at the time of reception of facsimile documents, in order to manage the different protocols and to store all the data on disks. Furthermore, a multi-task package of this type requires a large memory capacity, thus making this solution much more costly and difficult to implement by reason of the various technical constraints in regard to memory utilization which are imposed by current processing systems.

Finally, printing of received or transmitted facsimile documents can be performed only by means of the printer which is connected to the microcomputer. The low bit rate of the interfaces commonly employed (300,000 bits per second in the case of the parallel interfaces, 115,000 bits per second in the case of the series interfaces), associated with the above-mentioned limitations of the software package results in particularly long printing times which may amount to several tens of minutes in the case of a series connection.

SUMMARY OF THE INVENTION

The object of the present invention is to overcome these disadvantages by proposing a method of adaptation of a printer to an autonomous facsimile transmission function.

In accordance with the invention, there are assigned to the printer, in addition to its initial function of printing of documents, a function of transmission/reception of copy conveyed over a telephone line and a function of control and processing of said copy.

By means of the method in accordance with the invention, it is possible to obtain an autonomous facsimile unit by adaptation of a printer, which accordingly makes it possible to receive facsimile documents at each instant while only the printer concerned remains switched-on. It is accordingly possible to print facsimile documents rapidly and automatically at the time of each reception since the items of information do not have to pass through another system but arrive directly in the printer. Furthermore, with the method in accordance with the invention, no data-processing resource such as processor time, a hard disk or memory is consumed in a microcomputer which would be connected to the printer. Moreover, the method in accordance with the invention makes it possible to dispense with an internal connector of the microcomputer and can therefore be employed in the case of portable microcomputers not provided with extension connectors.

In an advantageous embodiment of the invention, there is also assigned to the printer a function of communication of digital data with at least one external device connected to said printer.

This communication function can thus permit remote control of the printer from a microcomputer, for example, and exchange of documents between a number of processing units.

In accordance with another aspect of the invention, the device which serves to adapt a printer to an autonomous facsimile transmission function and implements the method in accordance with the invention is characterized in that it comprises:

line interface means for transmitting and receiving data conveyed via a telephone line, printing interface means for transmitting data or documents to the printer, interface means for entering data derived from at least one external digital device, encoding/decoding means connected to the line interface means for respectively encoding and decoding data derived respectively from the input interface means and from the line interface means, means for routing on the one hand data derived from the input interface means either towards the line interface means via the encoding means or towards the printing interface means and on the other hand for routing data derived from the line interface means towards the printing interface means, and processing and computing means connected to the routing means and to the input interface means.

An adaptation device of this type makes it possible to create automatic systems for sharing a printer between a number of users without obliging them to wait until the printer is free before in turn being able to transmit a document.

Furthermore, by means of the present invention, provision is made for a unit which is not dedicated to an exclusive facsimile transmission task.

In addition, a printer which has thus been adapted as a facsimile unit can be remotely operated from a data-processing system, either in order to reprocess received facsimile documents or in order to process one or a number of facsimile documents to be transmitted.

Moreover, it is possible to choose the quality of printing of the copy according to the intrinsic quality of the printer which is equipped with the device in accordance with the invention.

BRIEF DESCRIPTION OF THE DRAWINGS

Other particular features and advantages of the invention will become further apparent from the description which follows hereinafter. In the accompanying drawings which are given by way of nonlimitative example.

DETAILED DESCRIPTION OF THE INVENTION

One form of construction of the device in accordance with the invention and its application to a printer will now be described at the same time as the method employed.

Figure 1:
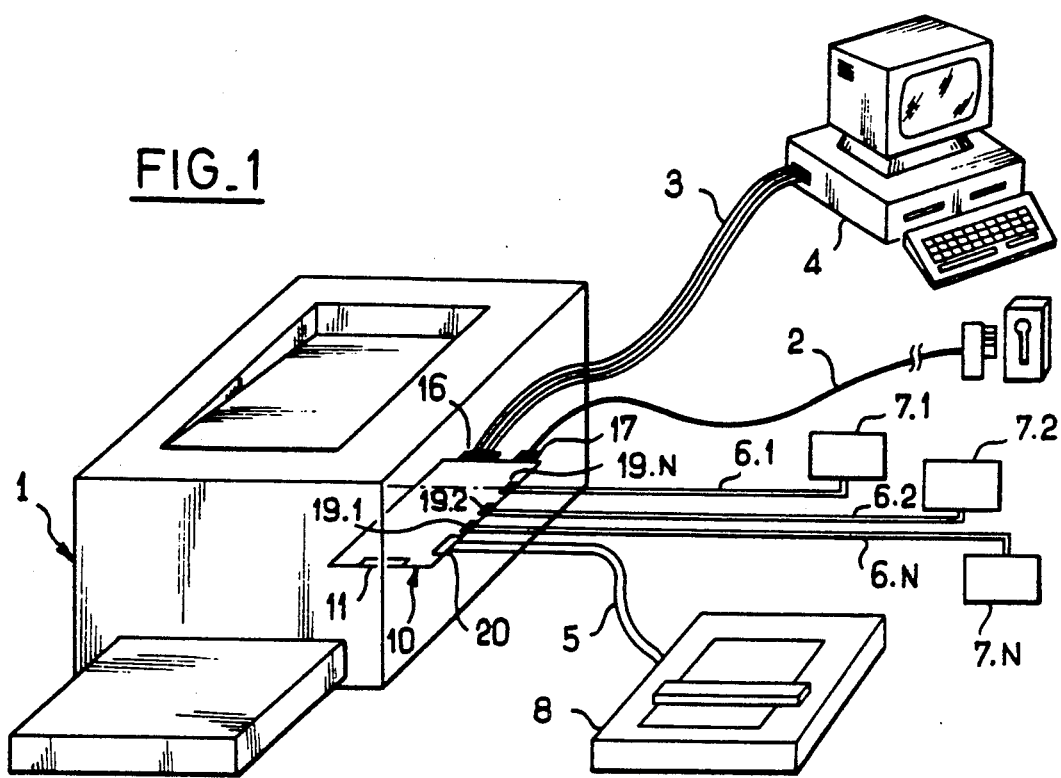
FIG. 1 is a simplified illustration of one embodiment of the invention which is provided with optional equipment.

The example of construction illustrated in FIG. 1 concerns the adaptation of a laser printer 1, for example of the Hewlett Packard type, Series II and IID, as a facsimile machine in accordance with the invention. An electronic card 10 constituting the interface device in accordance with the invention is inserted in a suitable location of the printer 1 for the addition of an extension card and connected to an internal connection of this latter via a connector of a printing interface 11. The adaptation card 10 is connected to a telephone network by means of a connection cable 2 via the connector of a line interface 17 and can be optionally connected to a microcomputer 4 by means of a parallel connection cable 3 via the connector of an interface or parallel port 16, to a scanner 8 by means of a connection cable 5 via the connector of an input interface 20 and to a plurality of microcomputers 7.1, 7.2, 7.N by means of series connection cables 6.1, 6.2, 6.N via series interface connectors 19.1, 19.2, 19.N.

Figure 2:
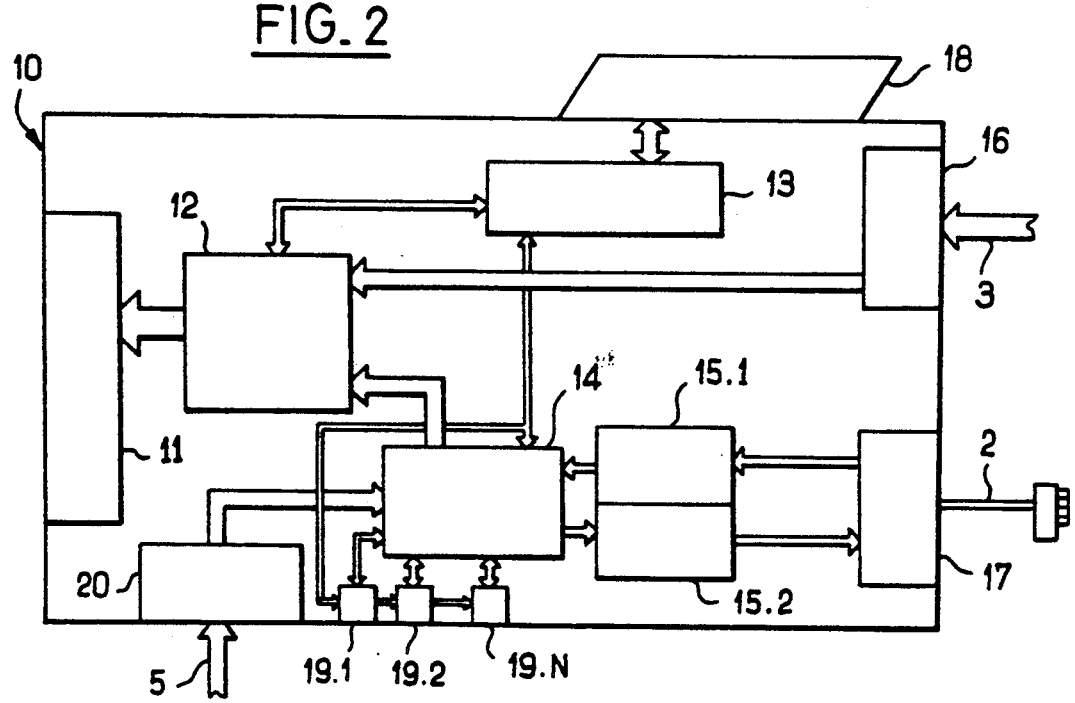
FIG. 2 is a block diagram of one embodiment of an adaptation card in accordance with the invention.

One example of the structure of the interface card 10 is illustrated in FIG. 2. It applies to the above-mentioned case of a printer which is provided with an internal connection bus. The card 1 comprises a routing unit 14 connected to the input interface 20 and to the series interfaces 19.1, 19.2, 19.N, a reception and coding unit 15.1 and a transmission and encoding unit 15.2 which are connected on the one hand to the line interface 17 and on the other hand to the routing unit 14. The card comprises in addition a unit 12 for storage of data prior to transfer for printing, connected at the input on the one hand to the parallel input interface 16 and on the other hand to the routing unit 14 and, at the output, to the printing interface 11 which connects the card 10 to the internal connection bus of the printer 1. A processing and computing unit 13 connected to a control panel 18 has the function of controlling the storage unit 12, the routing unit 14 and the series interfaces 19.1, 19.2, 19.N.

The parallel interface 16 enables the printer 1 to retain its normal function of printing peripheral of a microcomputer 4. The optional series interfaces 19.1, 19.2, 19.N permit a dialog between one or a number of microcomputers which are thus star-connected and the facsimile system in order to permit the possibility of carrying out data-processing operations on the received data or of transmitting by means of the facsimile system.

The input interface 20 permits connection of an optical reading system 8, especially a scanner, thus carrying out the sending of documents as with a conventional facsimile device. The control panel 18 which is accessible to the user permits manual control of transmission of facsimile documents and also makes it possible to have an overall view of the present state of the facsimile system (number of documents on standby, level of filling of the memories).

Within the processing and computing unit 13, means of the "firmware" type related to a control language are so designed as to permit a flexible configuration of the system thus created and to achieve optimum management of sharing of the adaptation card 1 between different simultaneous requestors. The necessary management parameters can be adjusted either from the control panel 18 or from one or a number of the series links 19. The control language contains the orders which permit the logic configuration of the interface card 10, relating for example to the high/low resolution transition, the number of rings before a reply, the choice of a reply identifier as well as additional orders for management of the facsimile system such as:

state request, storage of numbers, retrieval and printing of the log conventionally employed in facsimile transmission, management of priorities, reading of waiting copy, purge of waiting lines, reinitialization of the system.

The control panel 18 directly manages the computing and processing unit 13 which in turn controls the different units 12, 14 for storage and routing and the series interfaces 19.1, 19.2, 19.N.

The storage unit 12 is employed as printing buffer memory which makes it possible to complete the printing task in progress on the microcomputer 4 connected to the parallel interface 16 and therefore to provide the user with faster printing.

At the time of reception of a call originating from the telephone network, the line interface 17 trips and transmits the control to the reception and decoding unit 15.1 which then supervises the different protocols which are necessary for correctly establishing the communication, then receives the subject copy proper and, after having decoded the received data, transmits them to the routing unit 14. Depending on the configuration of the system, the routing unit 14 transmits the data either solely to the storage unit 12 for printing or also to the other series ports 19.1, 19.2, 19.3, 19.N concerned for data-processing in one or a number of external microcomputers 7.1, 7.2, 7.N.

At the time of transmission of copy either from one or a number of microcomputers 7.1, 7.2, 7.N which send their information or data, or by means of the series interfaces 19.1, 19.2, 19.N, or from the external scanner 8, these data are received by the routing unit 14 which either transmits them directly to the encoding and transmission unit 15.2 or stores them in the storage unit 12 while awaiting a subsequent treatment if the line is occupied, for example. Thus, by virtue of this storage unit 12 and up to the limit set by the size of the storage memory, a user who desires to transmit a facsimile document will have an immediate transmission print even if the facsimile document is really transmitted with a slight delay in the case for example of transmission of another document at the same instant.

The unit 15.2 for encoding and transmitting subject copy then encodes the data derived from the routing unit 14, in a format which is compatible with facsimile transmission standards. As a function of the parameters which have previously been transmitted thereto, said encoding and transmitting unit then gives the order to the line interface 17 to dial a number and to establish the connection with the distant correspondent. Said unit then ensures logical establishment of the communication and subsequently sends the encoded data.

At the request either of the series interfaces 19.1, 19.2, 19.N or of the parallel interface 16 or of the control panel 18, the log of communications transmitted and/or received, which is permanently stored in a predetermined zone of the storage unit 12, will be printed and/or sent to one or a number of the series interfaces 19.1, 19.2, 19.N and/or to the parallel interface 16.

When the printer involved in the adaptation in accordance with the invention is not provided with an internal connection bus, the interface device can in that case be placed within an independent casing connected to the parallel or series input port of the printer via the printing interface 11.

The device 10 in accordance with the invention can also be applied to any reprography system which is connectable to a data-processing system for carrying out the printing functions of this latter. In this case the device 10 is connected to an internal bus or to a communication port of the reprography system via the printing interface 11.

As will be readily apparent, the invention is not limited to the examples described and illustrated and many arrangements may be made in these examples without thereby departing from the scope of the invention.

Thus the method in accordance with the invention may concern any other type of printer such as matrix printers, thermal printers or ink-jet printers.

Consideration may also be given to the addition of complementary functions which make use of well-known techniques, such as :
the use of a DMA controller in order to accelerate transfers on the one hand between the storage unit and the printer and on the other hand between the storage unit and the routing unit,
the inclusion of an interpreter of the optional POSTCRIPT type by addition of a PROM memory,
the choice of a specialized processor or else the use of two processors, one being dedicated to management and the other being dedicated to facsimile transmission,
the possibility of using the memory either as a printing buffer or as a facsimile transmission buffer with dynamic allocation,
automatic recognition of the speed of connection of the series interfaces, and
simultaneous printing and facsimile transmission.

We claim:
1. A method for adapting a printer to an autonomous facsimile transmission apparatus, which comprises the steps of:
receiving a facsimile transmission conveyed over a telephone line;
decoding said facsimile transmission by said printer into document digital data; and
processing said decoded document digital data by the printer.

2. The method of claim 1, wherein a document converted into said document digital data is received by the printer from at least one peripheral external device connected to said printer.

3. The method of claim 2, wherein said received document digital data are encoded in said facsimile transmission and said encoded facsimile transmission is transmitted over said telephone line.

4. The method of claim 3, wherein said received document digital data are printed by said printer before or while said received document digital data are encoded and transmitted over said telephone line by said printer.

5. The method of claim 2, wherein said peripheral external device is an external control and processing unit.

6. The method of claim 5, wherein said received document digital data are selectively transmitted by said printer to said external data and processing unit.

7. The method of claim 2, wherein said peripheral external device is an external unit for optical reading of documents.

8. The method of claim 1, wherein said document digital data are selectively transmitted by said printer to an external control and processing unit connected to said printer.

9. The method of claim 2, wherein said received document digital data and decoded document digital data are selectively stored by said printer for subsequent use.

10. A device for adapting a printer to an autonomous facsimile transmission apparatus comprising:
line interface means for transmitting and receiving data conveyed via a telephone line,
printing interface means for transmitting data to the printer,
input interface means for entering data derived from at least one external digital device,
encoding/decoding means connected to the line interface means for respectively encoding and decoding data derived respectively from the input interface means and from the line interface means,
means for selectively routing data derived from the input interface means either towards the line interface means via the encoding means or towards the printing interface means and for routing data derived from the line interface means towards the printing interface means, and
processing and computing means connected to the routing means.

11. The device of claim 10, further comprising control means connected to the processing and computing means.

12. The device of claim 11, further comprising storage means for storing the data derived from the routing means, connected to the printing interface means, said storage means being controlled by the processing and computing means.

13. The device of claim 12, further comprising parallel interface means for transmitting to the printer via the storage means and the printing interface means data derived from an external control and processing unit.

14. The device of claim 10, wherein the input interface means are connected to an external optical document-reading device.

15. The device of claim 10, further comprising series interface means for connecting at least one external control processing device to the routing means.

16. The device of claim 10, placed on a plug-in extension card connected to an internal bus via the printing interface means and provided with a control panel which includes the control means.

17. The device of claim 10, housed within an independent casing connected to an input port of the printer via the printing interface means.

18. The device of claim 10 connected to a reprography system via the printing interface means.